United States Patent
Casas

(10) Patent No.: US 8,406,401 B2
(45) Date of Patent: Mar. 26, 2013

(54) INTERACTIVE VOICE RESPONSE SYSTEM TO BUSINESS APPLICATION INTERFACE

(75) Inventor: Robert M. Casas, Fairless Hills, PA (US)

(73) Assignee: Bank of America Corporation, Charlotte, NC (US)

( * ) Notice: Subject to any disclaimer, the term of this patent is extended or adjusted under 35 U.S.C. 154(b) by 580 days.

(21) Appl. No.: 12/684,203

(22) Filed: Jan. 8, 2010

(65) Prior Publication Data

US 2011/0170676 A1 Jul. 14, 2011

(51) Int. Cl.
*H04M 3/42* (2006.01)
*H04M 11/00* (2006.01)

(52) U.S. Cl. ................ 379/201.03; 379/88.18

(58) Field of Classification Search .......... 379/88.16, 379/88.17, 88.18, 201.03
See application file for complete search history.

(56) References Cited

U.S. PATENT DOCUMENTS

| | | | | |
|---|---|---|---|---|
| 6,335,964 | B1 * | 1/2002 | Bowater et al. | 379/88.16 |
| 6,801,604 | B2 * | 10/2004 | Maes et al. | 379/88.17 |
| 6,889,375 | B1 * | 5/2005 | Chan et al. | 717/123 |
| 2009/0172657 | A1 * | 7/2009 | Makelainen et al. | 717/174 |
| 2011/0099602 | A1 * | 4/2011 | Apparao et al. | 726/1 |

* cited by examiner

*Primary Examiner* — Mohammad Islam
(74) *Attorney, Agent, or Firm* — Michael A. Springs

(57) ABSTRACT

In some embodiments, a method for interfacing an interactive voice response system with a business application comprises receiving a function call from an interactive voice response system. A first function is selected from a first function library in response to the function call. Using the first function, a request for information from a business application is posted to a memory. The request is retrieved from the memory. The information from the business application is retrieved in response to the request. A second function is selected from a second function library. The second function is executed to post the requested information to the memory. The requested information is retrieved from the memory and transmitted to the interactive voice response system.

20 Claims, 2 Drawing Sheets

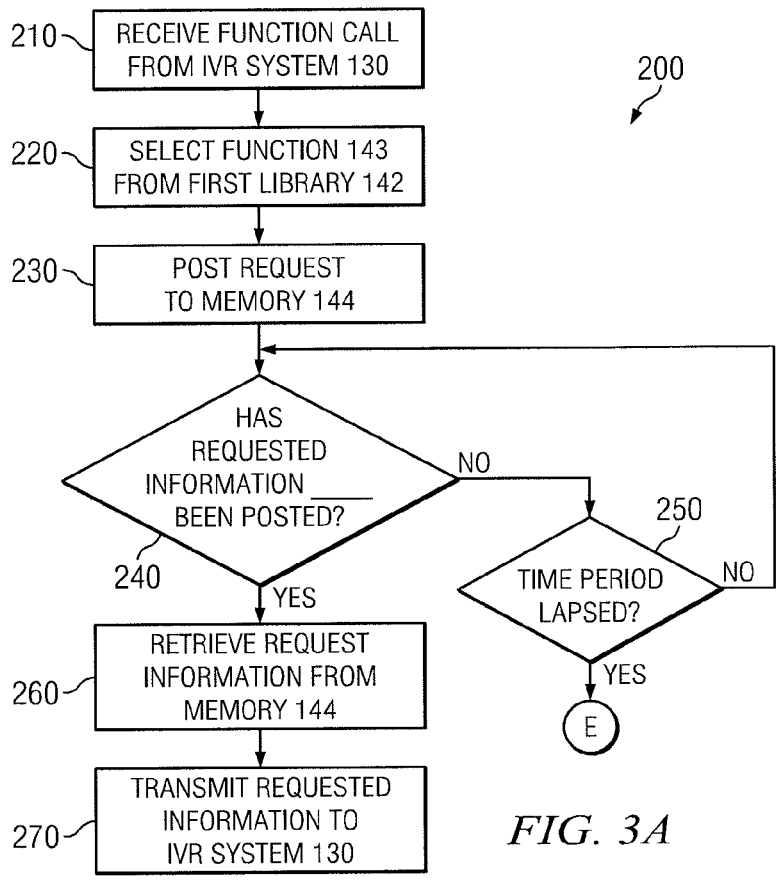
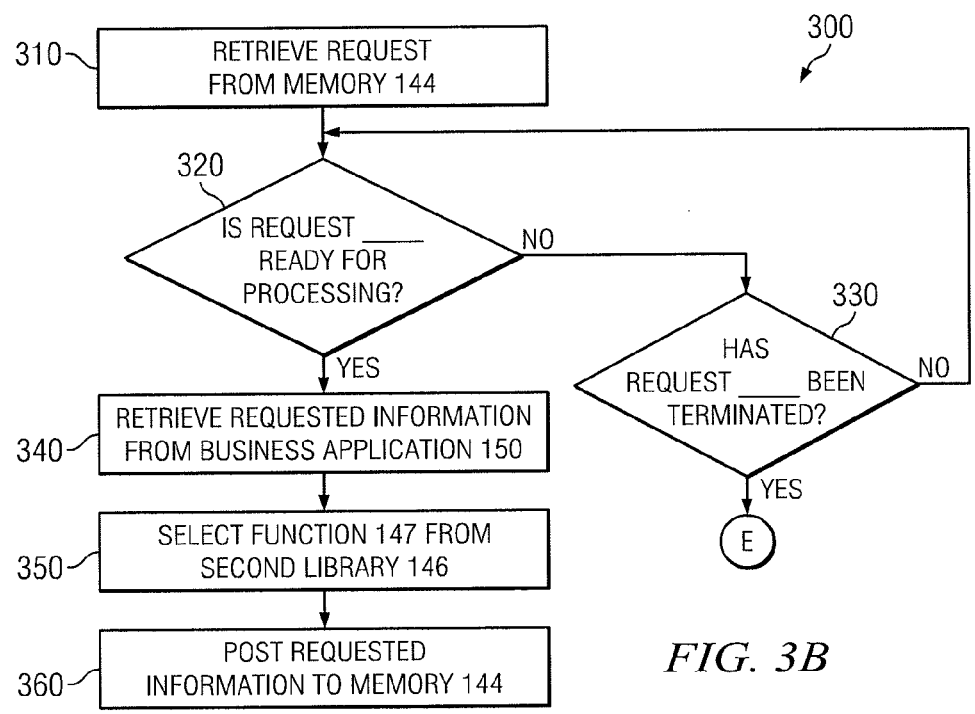
FIG. 3A
FIG. 3B

INTERACTIVE VOICE RESPONSE SYSTEM TO BUSINESS APPLICATION INTERFACE

TECHNICAL FIELD

The present disclosure relates generally to an interactive voice response system and more specifically to an interactive voice response system to business application interface.

BACKGROUND

An interactive voice response (IVR) system is a system that allows a computer to detect voice and/or keypad inputs. For example, a call processing system uses an IVR system to interact with callers. In one example, IVR systems allow callers to interact with the call processing system via a telephone keypad or by speech recognition.

SUMMARY

In some embodiments, a method for interfacing an interactive voice response system with a business application comprises receiving a function call from an interactive voice response system. A first function is selected from a first function library in response to the function call. Using the first function, a request for information from a business application is posted to a memory. The request is retrieved from the memory. The information from the business application is retrieved in response to the request. A second function is selected from a second function library. The second function is executed to post the requested information to the memory. The requested information is retrieved from the memory and transmitted to the interactive voice response system.

Certain embodiments of the invention may provide one or more technical advantages. A technical advantage of one embodiment may include the capability to interface between an interactive voice response system and a java application. Yet another technical advantage of one embodiment may include the capability to support blocking and non-blocking requests. Yet another technical advantage of one embodiment includes the capability to improve performance by executing native code rather than interpreted Java code.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which:

FIGS. 3A and 3B shows two methods for interfacing an interactive voice system with a business application according to some embodiments.

DETAILED DESCRIPTION

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
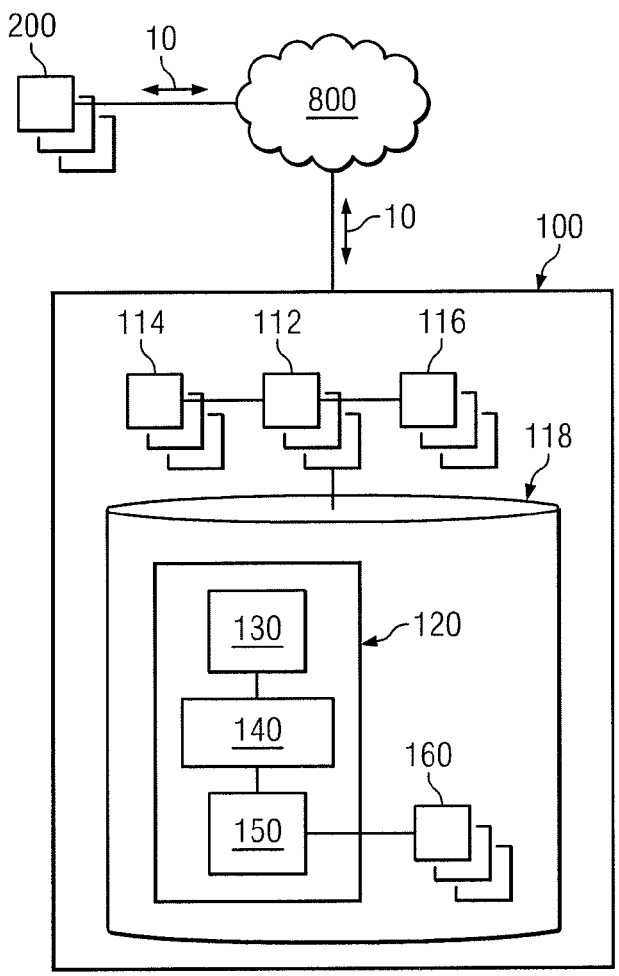
FIG. 1 shows a call processing system according to one embodiment.

FIG. 1 shows a call processing system 100 according to one embodiment. In operation, call processing system 100 processes communications 10 with callers 200. Communications 10 may include any communications transmitted using any audio and/or video means, including signals, data or messages transmitted through voice devices, text chat, web sessions, facsimile, instant messaging, and e-mail.

Call processing system 100 may include processors 112, input/output devices 114, network interfaces 116, and memory 118. In other embodiments, call processing system 100 may include more, less, or other components.

Processors 112 represent devices operable to execute logic contained within a medium. Examples of processor 112 include one or more microprocessors, one or more applications, and/or other logic. Call processing system 100 may include one or multiple processors 112.

Input/output devices 114 may include any device or interface operable to enable communication between call processing system 100 and external components, including communication with a user or another system. Example input/output devices 114 may include, but are not limited to, a mouse, keyboard, display, and printer.

Network interfaces 116 are operable to facilitate communication between call processing system 100 and callers 200. Network interfaces 116 may connect to any number and combination of wireline and/or wireless networks suitable for data transmission, including transmission of communications 10. Network interfaces 116 may, for example, communicate audio and/or video signals, messages, internet protocol packets, frame relay frames, asynchronous transfer mode cells, and/or other suitable information between network addresses. Network interfaces 116 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding. In one example embodiment, network interfaces 116 may connect to one or more networks 800 of FIG. 1.

Memory 118 represents any suitable storage mechanism and may store any information for use by call processing system 100. Memory 118 may comprise one or more tangible, computer-readable, and/or computer-executable storage medium. Examples of memory 118 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 118 stores logic 120. Logic 120 facilitates operation of call processing system 100. Logic 120 may include hardware, software, and/or other logic. Logic 120 may be encoded in one or more tangible media and may perform operations when executed by a computer. Logic 120 may include a computer program, software, computer executable instructions, and/or instructions capable of being executed by call processing system 100. Example logic 120 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 120 may also be embedded within any other suitable medium without departing from the scope of the invention.

In some embodiments, logic 120 facilitates operation of an interactive voice response (IVR) system 130, an interface 140, and/or a business application 150. In operation, interface 140 facilitates communication between IVR system 130 and business application 140.

IVR system 130 allows call processing system 100 to detect voice and/or keypad inputs. For example, in some embodiments, IVR system 130 collects information from callers 200 using analog signals generated by a human voice or other sound, and/or digital signals where the calling party includes the ability to generate digital signals. Additionally, in some embodiments, IVR system 130 collects information from callers through a telephone keypad. For example, IVR system 130 may present menu options to callers 200, and callers 200 may respond to the menu options by using the telephone keypad. In one example, IVR system 130 provides the following prompt to callers 200: "For Sales, please press '1' or say Sales. For Service, please press '2' or say Service. For Billing, please press '3' or say Billing."

IVR system 130 may be used to handle incoming communications 10 without the use of an operator. IVR system 130 may collect information from one or more callers 200 and store that information for future reference, or use that information to perform one or more tasks. IVR system 130 may also send that information to one or more agents that handle the communication 10. IVR system 130 may store this information internally, or may store this information in a database (not shown in FIG. 1) or other storage unit external to IVR system 130. IVR system 130 may also run one or more programs, execute one or more commands, or perform one or more processing functions on data collected from caller 200. IVR system 130 may record or play back messages, hold calls, or transfer calls to an attached switch, router, network, or other server.

In some embodiments, IVR system 130 may access information stored external to IVR system 130. In one exemplary embodiment, caller 200 requests billing information from IVR system 130. In this exemplary embodiment, business application 150 maintains the requested billing information. Accordingly, teachings of certain embodiments recognize the capability to provide interface 140 to facilitate communications between IVR system 130 and business application 150. Interface 140 may include any hardware, software, and/or other logic that enables communications between IVR system 130 and business application 150.

Business application 150 may include any software suitable for managing information and/or functions of a business or company. One example of business application 150 is an enterprise resource planning (ERP) system. An ERP system may include any software package configured to manage information and/or functions of a commercial enterprise. Some ERP systems include multiple software modules. Example software modules may include, but are not limited to, product lifecycle management, supply chain management (e.g., purchasing, manufacturing, and distribution), warehouse management, project management, customer relationship management (e.g., sales and marketing, commissions, service, customer contact, call center support), sales order processing, online sales, financials (e.g., costing, billing, time and expense, performance units, activity management), human resources (e.g., payroll, training, time and attendance, rostering, benefits), and decision support systems.

ERP modules may access one or more databases 160 that store ERP data for the various software modules. Example ERP data may generally include, but is not limited to: human resources master data (e.g., employee-related data from a human resources module, such as employee ID, first name, last name, email, position, skills, and rate); customer data (e.g., customer-related data, such as customer ID, name, country, city, state, street, and email); employee assignment data (e.g., assignment of employees to specific events or tasks, and including employee ID, start date, and finish date); capability master data (e.g., capabilities that are needed to perform tasks; may be used to identify areas for partnership and includes capability ID, capability name, description, capability category, category name, and category description); vendor data by capability (e.g., information about vendors and partners and the capability provided by them; includes vendor ID, name, capability ID, and capability name); skills data by employee (e.g., skill data stored for each employee; may be used to assign employees according to requirements and their skill and includes skills ID, skills name, and employee ID); position data by skills (e.g., positions defined by a human resources system, and includes position ID, description, skills, and rate); material master data (e.g., material-related information, including material number, description, unit of measure, and unit price); and/or any other suitable data.

Databases 160 may be organized according to any suitable model and accessible using any suitable query language. In one example embodiment, business application 150 may be configured to execute Java code. In this example, business application 150 may access databases 160 using a Java Database Connectivity (JDBC) Application Programming Interface (API). The JDBC API provides connectivity between the Java programming language and database 160. For example, business application 150 may access database 160 by calling Java methods through the JDBC API.

ERP systems are available in a variety of formats and configurations from a variety of providers. Example ERP system providers may include, but are not limited to, Oracle, SAP, and Microsoft. ERP systems may also include custom implementations, which may include integration of multiple software products.

Network 800 represents any suitable network operable to facilitate communications between call processing system 100 and callers 200. Examples of network 800 include a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Modifications or additions may be made to call processing system 100 without departure from the scope of the invention. For example, call processing system 100 may include more, fewer, or other sites, IVR systems 130, interfaces 140, and/or business applications 150. As another example, FIG. 1 illustrates IVR system 130, interface 140, business application 150, and databases 160 sharing a common memory 118. However, teachings of certain embodiments recognize the capability to distribute these components across multiple memories 118 and/or multiple call processing systems 100.

Figure 2:
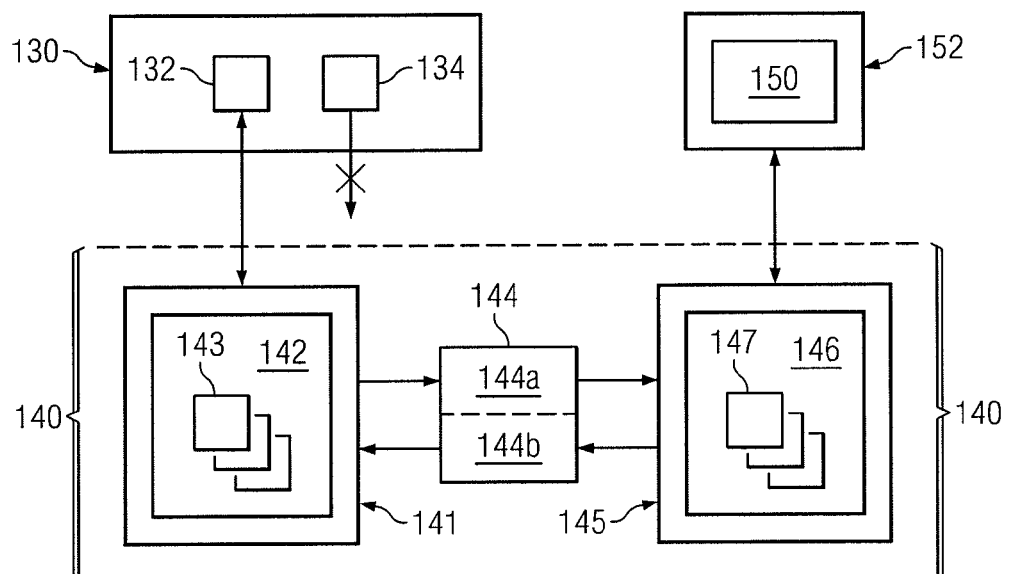
FIG. 2 shows a detailed view of the interactive voice response system, interface, and business application of FIG. 1 according to one embodiment.

FIG. 2 shows a detailed view of the IVR system 130, interface 140, and business application 150 of FIG. 1 according to one embodiment. In this exemplary embodiment, IVR system 130 features a C interface 132 and a Java bridge 134. C interface 132 may include any interface operable to allow IVR system 130 to call a C function. Java bridge 134 may include any interface operable to allow IVR system 130 to communicate with a Java application. For example, in one embodiment, Java bridge 134 allows IVR system 130 to call a Java method.

In this exemplary embodiment, interface 140 features a requesting module 141, a shared memory 144, and a responding module 145. In some embodiments, interface 140 uses UNIX System V Inter-process Communication to facilitate communication between requesting module 141 and responding module 145.

Requesting module 141 includes a library 142 of functions 143. One example of library 142 is a Sun-Solaris shared library containing functions 143. Functions 143 may include any functions operable to post a request for information to shared memory 144. In some embodiments, functions 143 are C functions operable to post a Java request to shared memory 144. In operation, requesting module 141 may receive a function call from IVR system 130, select an appropriate C function 143 from library 142, and execute C function 143 to post a Java request for information to shared memory 144.

Shared memory 144 may include any real or virtual memory that may be simultaneously accessed by multiple programs, such as requesting module 141 and responding module 145. One example of shared memory 144 may include a UNIX shared memory segment.

In the illustrated embodiment, shared memory 144 features a first memory portion 144a and a second memory portion 144b. First memory portion 144a represents a "C" to Java section, and second memory portion 144b represents a Java to "C" section. In this example, requesting module 141 would write to first memory portion 144a and read from second memory portion 144b, and responding module 145 would read from first memory portion 144a and write to second memory portion 144b. Teachings of certain embodiments recognize that first and second memory portions 144a and 144b may reduce the need for memory locks and avoid race condition issues.

Responding module 145 includes a library 146 of functions 147. One example of library 146 is a Sun-Solaris shared library containing functions 147. Functions 147 may include any functions operable to post information to shared memory 144. In some embodiments, functions 147 are operable to post the information to shared memory 144 in C. In operation, responding module 145 may receive information from business application 150, select an appropriate function 147 from library 146, and execute function 147 to post the information to shared memory 144.

In one example embodiment, functions 147 are C functions operable to post the information to shared memory 144 in C. However, as explained above, business application 150 may be configured to execute Java code. Accordingly, teachings of certain embodiments recognize the provisioning of a Java native interface 152. Java native interface 152 is a programming framework that allows Java code to call and be called by native applications and libraries written in other languages, such as C. For example, in one embodiment, Java native interface 152 allows business application 150 to call functions 147 in C.

In operation, call processing system 100 receives communication 10 from caller 200. Call processing system 100 directs communication 10 to IVR system 130. Call processing system 100, in response to communication 10, determines that information may be needed from databases 160. In one example, databases 160 may store customer information associated with caller 200, and call processing system 100 may need access to the customer information during communication 10 with caller 200.

Accordingly, IVR system 130 submits a function call to requesting module 141 using C interface 132. In response to receiving the function call, requesting module 141 selects an appropriate function 143 from library 142. In this example, requesting module 141 selects an appropriate function 143 for posting a request for customer information to shared memory 144.

Responding module 145 retrieves the request from shared memory 144 and requests information from business application 150. In response, business application 150 delivers the information from databases 160 to responding module 145. In one embodiment, business application 150 uses java native interface 152 to call an appropriate function 147 to post the information to shared memory 144. Requesting module 141 retrieves the information from memory 144 and transmits the information to IVR system 130.

In some embodiments, requesting module 141 may post multiple, concurrent, separate, and/or non-blocking requests to shared memory 144. Non-blocking requests may refer to any requests that do not block the processing of other requests. In one example, if IVR system 130 needs to query three different databases 160, it may do so without waiting for the first two requests to complete. In some embodiments, requesting module 141 may mix non-blocking and blocking requests, such as making two non-blocking and a final blocking request.

In some embodiments, the requests posted to shared memory 144 have a time stamp or a sequence number. A time stamp records the time at which requesting module 141 posts the request to shared memory 144. A sequence number records the order in which requesting module 141 posts requests to shared memory 144. For example, in one embodiment, responding module 145 searches shared memory 144 for requests and, if shared memory 144 has more than one posted request, retrieves the earliest posted request. Additionally, teachings of certain embodiments recognize the capability to cancel requests if the requested information is not posted to shared memory 144 before a defined time period has lapsed. In some embodiments, these defined time periods may be configured for performance. For example, in one embodiment, the defined time periods are set based on request volume.

In some embodiments, the request may be marked with a status. In one exemplary status, requesting module 141 marks the request as "waiting for response" after posting the request to shared memory 144. Responding module 145 marks the request as "in progress" after retrieving the request from the shared memory 144. Responding module 145 marks the request as "completed" after posting the requested information to shared memory 144.

FIGS. 3A and 3B shows two methods for interfacing IVR system 130 with business application 150 according to some embodiments. FIG. 3A shows a method 200 for interfacing IVR system 130 with business application 150 from the perspective of requesting module 141.

At step 210, requesting module 141 receives a function call from IVR system 130. At step 220, requesting module 141 selects function 143 from library 142. In this example, function 143 may be a C function.

At step 230, requesting module 141 executes function 143 to post a request to memory 144. In this example, requesting module 141 selects an appropriate function 143 for posting a request for customer information to shared memory 144.

At step 240, requesting module 141 determines whether responding module 145 has posted the requested information to memory 144.

If responding module 145 has not posted the requested information to memory 144, then requesting module 141 determines at step 250 whether the defined time period has lapsed. If the defined time period has lapsed, then method 200 ends. If the defined time period has not lapsed, then the method returns to step 240.

If responding module 145 has posted the requested information to memory 144, then requesting module 141 retrieves the requested information from memory 144 at step 260. In this example, requesting module 141 retrieves the requested information in C. At step 270, requesting module 141 transmits the requested information to IVR system 130.

FIG. 3B shows a method 300 for interfacing IVR system 130 with business application 150 from the perspective of responding module 145.

At step 310, responding module 145 retrieves the request for information from memory 144. At step 320, responding module 145 determines whether the request for information is ready for processing. For example, if memory 144 includes multiple requests for information, step 320 may include identifying the first-posted request for information.

If the request for information is not ready for processing, responding module 145 determines at step 330 whether the request has been terminated. If yes, then method 300 ends. If the request has not been terminated, then the method returns to step 320.

If the request for information is ready for processing, then responding module 145 retrieves the requested information from business application 150 at step 340.

At step 350, responding module 145 selects function 147 from library 146. In this example, responding module 145 selects an appropriate function 147 for posting the requested information to shared memory 144. Function 147 may be configured to post the requested information to memory 144 in C. At step 360, responding module 145 executes function 147 to post the requested information to memory 144.

Implementation Example

The following discussion presents an implementation example using a Peripro IVR system.

In this example, the following steps may be followed to implement a Java server application (one that serves one or more Peripro applications):

Peripro code:
1) Include IC_JavaInterface.folder
2) Populate JavaInterface.gcUCI with the unique call identifier, populate JavaInterface.gnSystem-number, JavaInterface.gnApplication-number, (one time per call only)
3) Choose desired method to use (Post and Wait, or Post and Return, etc—see below for details). Populate all other relevant variables before calling the java_interface function.
4) Call external function java_interface, passing only 1 parameter: the folder included above.

Java Code:
Using ns_JtoC.java as a template, replace the code starting and ending the comments below with the server code or calls to the class.method to use to perform the request:
/*
* Here, the real code should be processing the request.
The following code.
Up to the comment:
/* End of sample code to be replaced by real code */
Installation:
The two Dynamic Load Libraries should be installed. libtree.so for Card or libdeptree.so for Deposits, version 3.0 or above should be installed in /home/peri/T36893BoATelebanking/lib. The Java Native Interface library libjtoc.so should also be installed where Java's LD_LIBRARY_PATH point to.
Note on Multi-Threaded Java Applications If a Java application is going to use multiple threads to communicate with vengine for the same service, one of two methods should be used to avoid the scenario where two or more threads will process the same request under a race condition. The first one consists of using Java "synchronized" code when searching for requests in shared memory, effectively locking out other threads when searching for a request (see example Java code showing this method). The other method is to have each thread use a unique request code (see more details below). In order to have vengine and multiple Java threads using synchronized request codes, a convention could be adopted such as using port ranges for each thread. For example, if three threads in a certain application are going to be processing requests for Peripro in a system with 192 ports per TMS, Peripro could use code "0001" for ports 1-64, "0002" for ports 65-128 and "0003" for ports 129-192. Java would need to look for requests with a code of "0001", "0002" and "0003" for threads n, n+1 and n+2 respectively.

API Details

Peripro applications may communicate with Java applications by the following mechanism:
1. Peripro calls a "C" function to post a request. The "C" function writes the request information to the port's section in shared memory, time-stamping it.
2. When Java is ready to start processing a new request, it calls a native "C" method that searches the shared memory segment for a new request that has been allocated to it (more on this later) and that is marked as "Waiting for response" in the Peripro section. If it finds more than 1 request, it will choose the "earliest" one. If there are none, Java simply gives up control via a "thread.sleep" and searches again. If one is found, it marks it as "In progress" (on the Java section) and returns to Java for processing.
3. When the request is completed (for example, an Oracle Data Base access), Java calls another native "C" method that returns the requested data and marks it as "Request completed" in the Java section.
4. In the meantime, the Peripro function was either in a sleep loop or performing other work. When it's ready to check to see if the request has been completed, it looks at the Java status, and if marked as "Request completed", it returns the resulting data to Peripro.

Peripro communicates with its library's "C" function via a folder, IC_JavaInterface.folder, of type "Public, Include". The Peripro code populates this folder and calls the external function "java-interface", passing it only 1 argument, the folder. Upon completion of the request, the folder will contain the desired data if successful or a pertinent status code if unsuccessful.

The folder has an internal name of "JavaInterface" and consists of the following data cards:

gcVersion—type: string, length: 80 (Version control info)

gnUCI—type: number, length: 21. Unique Call Identifier, for error logs.

gcRequest-type—type: string, length: 1
- '1'=Post request and return immediately without waiting for results (non-blocking, asynchronous request).
- '2'=Test prior post status and return immediately (used in conjunction with '1' above, to see if request completed).
- '3'=Post request and wait for results (blocking, synchronous request—will post request and wait until either request completes or timeout occurs).
- '4'=Wait prior post and return—used in conjunction with '1' above, will wait until either request completes or timeout occurs.
- '5'=Post first part of multiple sub-buffer and wait for acknowledgement. Used when sending large buffers, a piece at a time. Will post request and wait for Java to retrieve buffer, but not wait for request completion. After final buffer is sent, Peripro must issue either a '2' (Test prior), or a '4' (Wait prior).
- '6'=Post next part of multiple sub-buffer request. Same as '5' above but for $2^{nd}$ and subsequent (not last) sub-buffer.
- '7'=Post last part of multiple sub-buffer request. Same as '5' and '6' above but for last sub-buffer. Note that this request is non-blocking (asynchronous) and Peripro must follow it with either a "Test prior post status and return immediately" or "Wait prior post and return".
- '8'=Retrieve next buffer. Used when Java returns large buffers, after completing a request. After issuing a '2' (Test prior), '3' (Post and wait), or '4' (Wait prior), if the status returned is "complete but in parts" ("001"), "2nd or subsequent buffer was returned" ("006"), Peripro should use this command FOR THE 2nd and subsequent buffers and re-assemble output until it receives a "final buffer" ("007") status.

gnSystem-number—type: number, length: 5. TMS number needs to be moved to this card. For example, 00756.

gnApplication-number—type: number, length: 5. Port number needs to be moved to this card. 00001 to 00192.

gcRequest-code—type: string, length: 10. Used to provide the ability to run multiple Java applications or multiple threads within 1 Java application.

Each unique Java application (or thread) should use a unique code. For example, if using SpeechKey and Auxiliary Data Base lookups (like transfers key search, etc), SpeechKey could use "0001" and the Aux DB lookup app use "0002". Also, if one Java application is using unsynchronized multiple threads to provide services to vengine, each thread must use a unique request code. This means that the Peripro code must be in "synch" with the Java Application (see note un multiple thread Java applications above). Note that if the request code length is less than 10, trailing spaces are removed when the code is moved to shared memory. This requires that the Java application refrain from using codes with trailing spaces (e.g., "12345" instead of "12345 ")

gnRequest-number—type: number, length: 1. Used for asynchronous requests, such as "post and return immediately". Peripro needs to populate this field with a value of 1 to 3.

gnInitial-delay-value—type: number, length: 5. This card and the next 2 are used for "post and wait" and "wait prior" request types. They provide a method to finely tune the request wait process. This card is to contain number of milliseconds to wait before testing for request completion the first time. An educated estimate should be made for the minimum number of milliseconds that the request will take, and set this card to that value. Range 1 to 500.

gnSubsequent-delay-value—type: number, length: 5. The number of milliseconds to wait during each wait loop iteration. Range 1 to 100.

This value is a compromise. Too large a value will result in waiting for a request that has already been fulfilled (sort of "ignoring" its completion), too small a value may steal unnecessary CPU cycles. Note that if the request is "Post first, $2^{nd}$ or subsequent or last part of multiple sub-buffer and wait for acknowledgement" the 3 timer values should be smaller than for other request types, as Java only needs to retrieve the buffer and "concatenate" it if not the $1^{st}$ part.

Note: Testing has shown that the delay process can be CPU intensive, so this value should be kept at around 20 milliseconds minimum. If the value is kept low, say 2 milliseconds and the iterations are high, the actual time the process will wait if there is no response will likely to be larger than specified due to the additional processing time taken to process the delay and Solaris' overhead (a 2 millisecond delay may actually take 4 milliseconds to execute).

gnMax-delay-iterations—type: number, length: 5. This value controls the timeout value. It contains the maximum number of times to delay the value in gnSubsequent-delay-value above before declaring a timeout.

Use this formula to calculate this value: Iterations=(Timeout_value−Initial_delay)/Subsequent_delay. Example. If the request can take no less that 100 milliseconds and no more than 2 seconds, we would set the initial delay to 100, the subsequent delay value to 20 milliseconds and the max iterations to 95. This value is a compromise also. Too small a timeout value may cause the code to abandon a request that is about to complete, too large a value will affect the Customer's experience.

gnLength-of-input—type: number, length: 4. Used for initial requests (Post and return, post and wait, post multiple). Since Peripro strings are not null terminated (rather fixed length, left justified and space filled to the right), it is important that this variable contain the actual length of the data in the input buffer below.

goInput-buffer—type: string, length: 1000. Input to be sent to Java. Search key, etc.

gnLength-of-output—type: number, length: 4. Length of buffer returned by Java below.

gcOutput-buffer—type: string, length: 1000. Data returned by Java.

gnStatus—type: number, length: 3.
- "000"=If request was "Post request and return immediately", request was initially successful (valid). If request was "Post first, $2^{nd}$ or last part of multiple sub-buffer and wait for acknowledgement", request was initially successful (valid) and Java retrieved the buffer. If request was "Post request and wait for results" or "Test prior post status and return immediately" or "Wait prior post and return", request was completed successfully.
- "001"=If request was "Post request and wait for results", "Test prior post status and return immediately" or "Wait prior post and return", request is complete but in parts. First of several sub-buffers was returned.

"002"=If request was "Post request and wait for results", "Wait prior post and return" or "Post first, $2^{nd}$ or last part of multiple sub-buffer and wait for acknowledgement", timeout has occurred.

"003"=Invalid parameters supplied. See peri_trace for actual error details. Examples, TMS number or port number is invalid, timer values out of range, etc).

"004"=Request failed (Returned by Java) or illogical status returned by Java. For example, Oracle request failed (not found, etc). See pertinent alarm or Java log for details.

"005"=If request is "Test prior post status and return immediately", request has not yet completed.

"006"=If request is "Retrieve next buffer", a $2^{nd}$ or subsequent buffer was returned.

"007"=If request is "Retrieve next buffer", the last buffer was returned.

"008"=Error opening, reading or parsing /common/etc/tms/tms.cfg file.

"009"=Error mapping shared memory segment, TMS configuration file Issues, input data too long, or a Unix error occurred (peri_trace should contain more detailed information).

Note on the Use of the Partial Buffers Facility

The interface code allows partial buffers to be sent and received from Java, when sending large buffers. Although the facility exists, it is recommended that the maximum size of data to be sent and received be calculated and, unless it is extremely large, the buffer sizes should set accordingly. This affords much higher performance and a cleaner implementation. For example, if 8,000 byte Java to Peripro buffers are implemented, the amount of total memory used is 8 megabytes, which represents 0.2% of total RAM in Solaris 8, 2.1 systems with 4 gigabytes of memory (0.1% of total RAM for 8 gigabyte systems).

Step by Step Processing:

1. Peripro one-time (boot-up) Initialization code: Populates System-number, Application-number and Request-type. (Note: if there is no one-time boot-up init code, this should be done in call initialization below).

2. Peripro call initialization: Populates UCI.

3. Post request and return without waiting for the results. (This section also covers part of multiple buffer requests).

Peripro: Populates Request-type, Request-number, length of input and input buffer and calls java-interface with only 1 argument, the folder.

Peripro's "C" library: Insures only 1 argument was passed (else it abends), insures length of folder passed matches its expected length (else it abends), validates all other parameters (if any are invalid, returns 003). If the call to java-interface is the first time it's executed for the port, it initializes the port's 3 shared memory sections before the next step. It then increments the "C" to Java sequence number and copies the information to the appropriate shared memory section. It then returns with a successful ("000") status.

Java application: The Java application loops using a thread.sleep of a certain value. Since a "too small" sleep value wastes CPU time and a "too large" sleep value lowers performance, the following simple "self tuning" algorithm is recommended:

Init a sleep value integer variable to say, 2 milliseconds.

Each time no requests are found, delay the value in the variable and, if the variable is less than a certain large values (say, 64), multiply it by 2. If 64 or greater, leave it as is.

When a request is found, re-initialize the variable to 2. This will result in a delay value of 2, 4, 8, 16, 32, 64, 64, 64 . . . , etc., when there are no requests to process. When there are requests, the delay value will be 2, 2, 2, etc. This causes the sleep value to be small when there is a lot of Java work to be done, and to be larger when there is no Java work to be done (allowing other processes that are busier to execute).

To find if it has a work to do, Java calls a native "C" function that searches the entire shared memory segment (across all TMS and all ports sub-sections). Looking in the "C" to Java part, it searches for the "oldest" sub-section that has a matching Request Code, a "waiting for response" or "buffer retrieved" status in the "C" to Java section and a non-matching sequence number ("C" to Java's sequence # is different than Java to "C" sequence #, this insures the same request is not processed several times). If none is found, it returns "none found", else it copies the sequence number to the Java to "C" section, sets it's own section's status to "Request in progress" and it returns the appropriate data to Java: UCI, "all or part" indicator, length of buffer, part number (relevant if multiple buffers were sent) and input buffer.

Except for $1^{st}$ and $2^{nd}$/subsequent buffer request, the Java application processes the request. If Java is using non-blocking (asynchronous) calls to perform the work, it goes back to the search loop. When the request completes, it calls another native "C" function to return the results (failure or request complete) and continues the search loop. If the work the application performs causes it to block, it returns the results upon completion of the request. If processing a $1^{st}$ and $2^{nd}$/subsequent buffer request, Java saves or concatenates the data and calls another native "C" function to return the "buffer retrieved" status.

4. Test prior post status and return immediately.

Peripro: Populates Request-type and Request-number and calls java-interface with only 1 argument, the folder.

Peripro's "C" library: Insures only 1 argument was passed (else it abends), insures length of folder passed matches its expected length (else it abends), validates all other parameters (if any are invalid, returns 003). Insures that the previous request was a "Post request and return immediately without waiting for results" or a "Test prior post status and return immediately". If not, it returns 003. It then checks the selected port's shared memory Java to "C" section for a matching sequence number and a status of "request completed", "request failed" or "buffer available". If one of these is found and sequence numbers match, it returns a status of "000", "004" or "001" respectively. Except for "request failed", the output buffer is copied to the folder, setting the length, etc. If none of those status values are found, it returns a status of "005".

Java application: Obviously, no corresponding Java code is applicable to this type of request.

5. Post request and wait for result.

Peripro: Populates Request-type, Request-number, the 3 timer values, length of input and input buffer and calls java-interface with only 1 argument, the folder.

Peripro's "C" library: Insures only 1 argument was passed (else it abends), insures length of folder passed matches its expected length (else it abends), validates all other parameters (if any are invalid, returns 003). If the call to java-interface is the first time it's executed for the port, it initializes the port's 3 shared memory sections before the next step. It then increments the "C" to Java sequence number and copies the information to the appropriate shared memory section. It then waits the initial wait value, and when wait is completed, it checks for a matching sequence number and a completion status or error returned. If an error is returned, it returns the error. If complete, it returns with a successful status. If not complete, it loops waiting the "Subsequent delay value", checking, etc. If no error or complete status is seen after the last iteration, it returns a timeout. If error is seen, it returns it. If completion is seen, it returns with a successful status.

Java application: See "Post request and return immediately without waiting for Results", as the processing is the same.

6. Wait prior post and return.

Peripro: Populates Request-type, Request-number and the 3 timer values and calls java-interface with only 1 argument, the folder.

Peripro's "C" library: Insures only 1 argument was passed (else it abends), insures length of folder passed matches its expected length (else it abends), validates all other parameters (if any are invalid, returns 003). Insures that the previous request was a "Post request and return immediately without waiting for results", a "Test prior post status and return immediately", or a "Post last buffer". If not, it returns 003. It then waits the initial wait value, and when wait is completed, it checks for a matching sequence number and a completion status or error returned. If an error is returned, it returns the error. If complete, it returns with a successful status. If not complete, it loops waiting the "Subsequent delay value", checking, etc. If no error or complete status is seen after the last iteration, it returns a timeout. If error is seen, it returns it. If completion is seen, it returns with a successful status after moving the returned data to the folder and setting the length, etc.

Java application: Obviously, no corresponding Java code is applicable to this type of request.

7. Post first part of multiple sub-buffers and wait for acknowledgement.

Peripro: Populates Request-type, Request-number, the 3 timer values, length of input and input buffer and calls java-interface with only 1 argument, the folder.

Peripro's "C" library: Insures only 1 argument was passed (else it abends), insures length of folder passed matches its expected length (else it abends), validates all other parameters (if any are invalid, returns 003). If the call to java-interface is the first time it's executed for the port, it initializes the port's 3 shared memory sections before the next step. It then increments the "C" to Java sequence number and copies the information to the appropriate shared memory section. It then waits the initial wait value, and when wait is completed, it checks for a matching sequence number and a "buffer retrieved" status in the Java to "C" section (not completion) or error returned. If an error is returned, it returns the error. If buffer was retrieved, it returns with a successful status. Else, it loops waiting the "Subsequent delay value", checking, etc. If no error or buffer retrieved status is seen after the last iteration, it returns a timeout. If error is seen, it returns it. If a "buffer retrieved" status is seen, it returns with a successful ("000") status.

Java application: The Java application processing for this type of request is the same as the processing of the "Post request and return immediately without waiting for results" except as follows: Java retrieves the buffer and waits for the next part (it obviously does not proceed to process the request), returning a "buffer retrieved" status.

8. Post next part of multiple sub-buffer request.

Peripro: Populates Request-type, Request-number, the 3 timer values, length of input and input buffer and calls java-interface with only 1 argument, the folder.

Peripro's "C" library: Insures only 1 argument was passed (else it abends), insures length of folder passed matches its expected length (else it abends), validates all other parameters (if any are invalid, returns 003). Insures that the previous request was a "Post first part of multiple sub-buffer and return immediately without waiting for results". If not, it returns 003. It then copies the information to the appropriate shared memory section. Next, it waits the initial wait value, and when wait is completed, it checks for a matching sequence number and a "buffer retrieved" status in the Java to "C" section (not completion) or error returned. If an error is returned, it returns the error. If buffer was retrieved, it returns with a successful status. Else, it loops waiting the "Subsequent delay value", checking, etc. If no error or buffer retrieved status is seen after the last iteration, it returns a timeout. If error is seen, it returns it. If a "buffer retrieved" status is seen, it returns with a successful ("000") status.

Java application: The Java application processing for this type of request is the same as the processing of the "Post request and return immediately without waiting for results" except as follows: Java insures it can retrieve the buffer (its length plus the length of the previous buffer retrieved is not over its own buffer length), it retrieves the buffer and waits for the next or last part (it obviously does not proceed to process the request), returning a "buffer retrieved" status.

9. Post last part of multiple sub-buffer request.

Peripro: Populates Request-type, Request-number, the 3 timer values, length of input and input buffer and calls java-interface with only 1 argument, the folder.

Peripro's "C" library: Insures only 1 argument was passed (else it abends), insures length of folder passed matches its expected length (else it abends), validates all other parameters (if any are invalid, returns 003). Insures that the previous request was a "Post first/next part of multiple sub-buffer and return immediately without waiting for results". If not, it returns 003. It then copies the information to the appropriate shared memory section. Next, it waits the initial wait value, and when wait is completed, it checks for a matching sequence number and a "buffer retrieved" status in the Java to "C" section (not completion) or error returned. If an error is returned, it returns the error. If buffer was retrieved, it returns with a successful status. Else, it loops waiting the "Subsequent delay value", checking, etc. If no error or buffer retrieved status is seen after the last iteration, it returns a timeout. If error is seen, it returns it. If a "buffer retrieved" status is seen, it returns with a successful ("000") status.

Java application: The Java application processing for this type of request is the same as the processing of the "Post request and return immediately without waiting for results" except as follows: Java insures it can retrieve the buffer (its length plus the length of the previous buffer retrieved is not over its own buffer length), concatenates the last part received, returns a "buffer retrieved" status and, since it now has the entire set of data, it processes the request. NOTE: Java changes the Java to C status from "buffer retrieved" to "request completed" (or "buffer available") when request completes. This is critical since it is the only way for Peripro knows the request completed (the sequence numbers would remain the same from the time the last buffer was retrieved through the completion of the request, so it is not a good indication of completion).

10. Retrieve next buffer (Used when a status of "001" was received).
   Peripro: Populates Request-type, Request-number, the 3 timer values and calls java-interface with only 1 argument, the folder.
   Peripro's "C" library: Insures only 1 argument was passed (else it abends), insures length of folder passed matches its expected length (else it abends), validates all other parameters (if any are invalid, returns 003). Insures that the previous request was a "Post request and wait for results", "Test prior post status and return immediately" or "Wait prior post and return" and Java indicated that data to be returned is in pieces and first buffer was returned. If not, it returns 003. It then copies the information to the appropriate shared memory section. Next, it waits the initial wait value, and when wait is completed, it checks for a matching sequence number and a "buffer available" status in the Java to "C" section (not completion) or error returned. If an error is returned, it returns the error. If a buffer is available, it returns with a successful status. Else, it loops waiting the "Subsequent delay value", checking, etc. If no error or buffer available status is seen after the last iteration, it returns a timeout. If error is seen, it returns it. If a "buffer available" status is seen, it returns with a successful ("006" or "007") status.
   Java application: The Java application processing for this type of request is the same as the processing of the "Post request and return immediately without waiting for results" except as follows:
   When the Java request completes, the Java application tests to see if the data received can be returned in one operation or it needs to be broken up as its length is greater than the shared memory output area. When this is the case, the Java application needs to return the data in several parts, calling the $2^{nd}$ native "C" routine to return each part and setting the "all or part" indicator to 1 (first partial), 2 ($2^{nd}$ and subsequent) or 3 (last buffer), length, total length, "x of y" counter and "buffer available" status.

Java Interface Shared Memory Maintenance

Following are the Unix commands needed to display and clear the Java Interface Shared Memory segment:

ipcs-bomp

This command will display the status of all Solaris active Shared Memory segments. During normal operation, the display after this command is executed should look something like this:

| T | ID | KEY | MODE | OWNER | GROUP | NATTCH | SEGSZ | CPID | LPID |
|---|---|---|---|---|---|---|---|---|---|
| Shared Memory: | | | | | | | | | |
| m | 0 | 0x2000490f | --rw-rw-rw- | peri | root | 24 | 147832 | 2118 | 5577 |
| m | 1 | 0x1 | --rw-rw-rw- | peri | root | 24 | 33148 | 2118 | — |
| m | 300 | 0xca5a5 | --rw-rw-rw- | peri | root | 24 | 2451456 | 25900 | 26839 ← |

In a production or test environment, there will be several lines describing many shared memory segments, as Peripro's "vengine" creates them for shared folders, etc. The entry with the arrow on the right margin above is the one created by the Java Interface (identified by its unique key).

The number under the "NATTCH" heading represents the number of processes attached to the interface's shared memory segment.

Note that if the interface's segment is not displayed (such after a reboot where no calls that need the interface were made), it will be automatically created when the interface is called the first time.

Occasionally, the interface's shared memory segment may need to be removed without having to reboot the MPS (for example, when a new libtree.so or libdeptree.so is installed and the size of the interface's shared memory segment has changed). To do so, use the following command:

iperm-M 0xca5a5

The command should be followed by the "ipcs-bomp" command to insure that the segment is indeed gone. Again, it will be re-created with the proper size the first time it is used. Obviously, if the MPS is rebooted, there's no need to remove the segment.

Miscellaneous Utilities

The following utilities can be used by the development team to trouble-shoot and to unit test the Java Interface: A utility named "print_shared_memory" can be used to display the contents of the shared memory segment. Its data is formatted and displayed on stdout. A couple of utilities can be used to "poke" data into a particular port's section of shared memory. "set_c_to_j" is used to set the "C to Java" section and "set_j_to_c" is used to set the "Java to C" section. These two utilities will optionally use command line arguments or configuration files that contain the data to be moved to shared memory.

Note that the "set" utilities are to be used separately and with only one side of the vengine/Java running. For example, to unit test a Java application, the application should run without calls to vengine, while the developer sets shared memory segments using set_c_to_j and displaying the Java results using print_shared_memory.

To unit test a Peripro application that uses the interface, the developer would use set_j_to_c after making a call. This should be done quickly and within the timeout value, else a timeout condition will occur. (A long timeout value should be coded temporarily while using this method).

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A method for interfacing an interactive voice response system with a business application, comprising:
   receiving a function call from an interactive voice response system, the interactive voice response system comprising a C programming language interface and a Java bridge operable to communicate with a Java application, wherein the interactive voice response system transmits the function call as a C programming language function call through the C programming language interface;
   selecting a first function from a first function library in response to the function call, wherein the first function is a C programming language function;
   using the first function, posting a Java request for information from a business application to a memory;
   retrieving the request from the memory;
   retrieving the information from the business application in response to the request;
   selecting a second function from a second function library, the second function configured to post the requested information to the memory in C programming language;
   executing the second function to post the requested information to the memory in C programming language;
   retrieving the requested information from the memory; and
   transmitting the requested information to the interactive voice response system.

2. The method of claim 1, wherein the business application is an ERP system, and retrieving the information from the business application comprises retrieving one or more records from one or more databases associated with the ERP system.

3. The method of claim 1, wherein:
   the business application is a Java application;
   the second function is a C programming language function; and
   the executing the second function comprises calling the second function through a Java Native Interface.

4. The method of claim 1, further comprising:
   marking the request as waiting for response after posting the request to the memory;
   marking the request as in progress after retrieving the request from the memory; and
   marking the request completed after posting the requested information to the memory.

5. The method of claim 1, wherein:
   the memory comprises a first portion and a second portion;
   the posting the request to the memory comprises posting the request to the first portion;
   the retrieving the request from the memory comprises retrieving the request from the first portion;
   the posting the requested information to the memory comprises posting the requested information to the second portion; and
   the retrieving the requested information from the memory comprises retrieving the requested information from the second portion.

6. The method of claim 1, the retrieving the request from the memory further comprising:
   searching the memory for requests; and
   if the memory comprises more than one posted request, retrieving an earliest posted request.

7. The method of claim 6, further comprising cancelling the request if the requested information is not posted to the memory before a defined time period has lapsed.

8. A system for interfacing an interactive voice response system with a business application, comprising logic encoded on a computer-readable storage medium such that when executed by one or more processors is operable to:
   receive a function call from an interactive voice response system, the interactive voice response system comprising a C programming language interface and a Java bridge operable to communicate with a Java application, wherein the interactive voice response system transmits the function call as a C programming language function call through the C programming language interface;
   select a first function from a first function library in response to the function call, wherein the first function is a C programming language function;
   using the first function, post a Java request for information from a business application to a memory;
   retrieve the request from the memory;
   retrieve the information from the business application in response to the request;
   select a second function from a second function library, the second function configured to post the requested information to the memory in C programming language;
   execute the section function to post the requested information to the memory in C programming language;
   retrieve the requested information from the memory; and
   transmit the requested information to the interactive voice response system.

9. The system of claim 8, wherein the business application is an ERP system, the logic when executed being further operable to retrieve the information from the business application by retrieving one or more records from one or more databases associated with the ERP system.

10. The system of claim 8, wherein:
    the business application is a Java application;
    the second function is a C programming language function; and
    the executing the second function comprises calling the second function through a Java Native Interface.

11. The system of claim 8, the logic when executed being further operable to:
    mark the request as waiting for response after posting the request to the memory;
    mark the request as in progress after the retrieving the request from the memory; and
    mark the request completed after posting the requested information to the memory.

12. The system of claim 8:
wherein the memory comprises a first portion and a second portion;
the logic when executed being operable to post the request to the memory by posting the request to the first portion;
the logic when executed being operable to retrieve from the memory by retrieving the request from the first portion;
the logic when executed being operable to post the requested information to the memory by posting the requested information to the second portion; and
the logic when executed being operable to retrieve the requested information from the memory by retrieving the requested information from the second portion.

13. The system of claim 8, the logic when executed being further operable to retrieve the request from the memory by:
searching the memory for requests; and
if the memory comprises more than one posted request, retrieving an earliest posted request.

14. The system of claim 13, the logic when executed being further operable to cancel the request if the requested information is not posted to the memory before a defined time period has lapsed.

15. Logic encoded in one or more non-transitory computer-readable storage media for execution and when executed by a processor operable to provide:
a requesting module, configured to:
receive a function call from an interactive voice response system, the interactive voice response system comprising a C programming language interface and a Java bridge operable to communicate with a Java application, wherein the interactive voice response system transmits the function call as a C programming language function call through the C programming language interface;
select a first function from a first function library in response to the function call, wherein the first function is a C programming language function;
using the first function, post a Java request for information from a business application to a memory;
retrieve the requested information from the memory; and
transmit the requested information to the interactive voice response system; and
a responding module, configured to:
retrieve the request from the memory;
retrieve the requested information from the business application in response to the request;
select a second function from a second function library, the second function configured to post the requested information to the memory in C programming language; and
execute the second function to post the requested information to the memory in C programming language.

16. The logic of claim 15, wherein the business application is an ERP system, the responding module being further operable to retrieve the requested information from the business application by retrieving one or more records from one or more databases associated with the ERP system.

17. The logic of claim 15, wherein:
the business application is a Java application;
the second function is a C programming language function; and
the second function is executed by calling the second function through a Java Native Interface.

18. The logic of claim 15:
the requesting module being further configured to mark the request as waiting for response after posting the request to the memory; and
the responding module being further configured to:
mark the request as in progress after the retrieving the request from the memory; and
mark the request completed after posting the requested information to the memory.

19. The logic of claim 15:
wherein the memory comprises a first portion and a second portion;
the requesting module being operable to post the request to the memory by posting the request to the first portion;
the requesting module being operable to retrieve from the memory by retrieving the request from the first portion;
the responding module being operable to post the requested information to the memory by posting the requested information to the second portion; and
the responding module being operable to retrieve the requested information from the memory by retrieving the requested information from the second portion.

20. The logic of claim 15, the responding module being further operable to retrieve the request from the memory by:
searching the memory for requests; and
if the memory comprises more than one posted request, retrieving an earliest posted request.

* * * * *